United States Patent
Birk et al.

(10) Patent No.: US 7,822,206 B2
(45) Date of Patent: Oct. 26, 2010

(54) SYSTEMS AND METHODS FOR MANAGEMENT AND AUTO-GENERATION OF ENCRYPTION KEYS

(75) Inventors: Peter D. Birk, Austin, TX (US); Keys D. Botzum, Columbia, MD (US); Ching-Yun Chao, Austin, TX (US); Hyen V. Chung, Round Rock, TX (US); Alaine DeMyers, Austin, TX (US); Ut Van Lee, Austin, TX (US); James L. Lentz, Austin, TX (US); Mickella A. Rosiles, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 904 days.

(21) Appl. No.: 11/553,276

(22) Filed: Oct. 26, 2006

(65) Prior Publication Data

US 2008/0101610 A1    May 1, 2008

(51) Int. Cl.
*H04L 9/08* (2006.01)
(52) U.S. Cl. .................. 380/277; 380/44; 380/278; 380/279
(58) Field of Classification Search .................. 380/277, 380/278, 279, 44
See application file for complete search history.

(56) References Cited

U.S. PATENT DOCUMENTS

| | | | |
|---|---|---|---|
| 6,052,787 A | 4/2000 | Euchner et al. | |
| 6,307,936 B1 * | 10/2001 | Ober et al. | 380/30 |
| 6,401,203 B1 | 6/2002 | Eigeles | |
| 6,785,809 B1 | 8/2004 | Hardjono | |
| 6,888,944 B2 | 5/2005 | Lotspiech et al. | |
| 7,240,365 B2 * | 7/2007 | de Jong et al. | 726/9 |
| 2002/0126849 A1 * | 9/2002 | Howard et al. | 380/277 |
| 2003/0126458 A1 | 7/2003 | Teramoto et al. | |
| 2003/0149876 A1 * | 8/2003 | McGough | 713/171 |
| 2004/0037424 A1 | 2/2004 | Numao et al. | |
| 2004/0096063 A1 | 5/2004 | Carroni et al. | |
| 2005/0044356 A1 | 2/2005 | Srivastava et al. | |
| 2005/0132070 A1 * | 6/2005 | Redlich et al. | 709/228 |
| 2005/0144439 A1 * | 6/2005 | Park et al. | 713/155 |
| 2007/0101436 A1 * | 5/2007 | Redlich et al. | 726/27 |
| 2008/0080713 A1 * | 4/2008 | Cho et al. | 380/273 |

OTHER PUBLICATIONS

Lin, P., Dossier for CA Application No. CA8930161 entitled "Key Manager for Multiple Distributed Computing Environment Servers"; TDB, v38, n9, 09-95, p. 337-340; 2 pgs.

* cited by examiner

*Primary Examiner*—Edan Orgad
*Assistant Examiner*—Bradley Holder
(74) *Attorney, Agent, or Firm*—Libby Z. Toub; Schubert Law Group PLLC (57) ABSTRACT

Systems, methods and media for managing and generating encryption keys are disclosed. In one embodiment, a processor executes encryption key processing computer code to receive requests for keys from an application program. The processor determines whether the requesting application program executes on a node or server that is within the scope of machines authorized to receive the requested keys. If authorized, the processor produces a key map and sends the key map to the application program, enabling the application program to access one or more keys in the key map. The keys are updated automatically according to a specifiable schedule.

20 Claims, 6 Drawing Sheets

SYSTEMS AND METHODS FOR MANAGEMENT AND AUTO-GENERATION OF ENCRYPTION KEYS

FIELD

The present invention is in the field of encryption within computer systems. More particularly, the invention relates to the management and generation of encryption keys in computing systems.

BACKGROUND

Many different types of computing systems have attained widespread use around the world. These computing systems include personal computers, servers, mainframes and a wide variety of stand-alone and embedded computing devices. Sprawling client-server systems exist, with applications and information spread across many PC networks, mainframes and minicomputers. In a distributed system connected by networks, a user may access many application programs, databases, network systems, operating systems and mainframe applications. Computers provide individuals and businesses with a host of software applications including word processing, spreadsheet, and accounting. Further, networks enable high speed communication between people in diverse locations by way of e-mail, websites, instant messaging, and web-conferencing.

A common architecture for high performance, single-chip microprocessors is the reduced instruction set computer (RISC) architecture characterized by a small simplified set of frequently used instructions for rapid execution. Thus, in a RISC architecture, a complex instruction comprises a small set of simple instructions that are executed in steps very rapidly. These steps are performed in execution units adapted to execute specific simple instructions. In a superscalar architecture, these execution units typically comprise load/store units, integer Arithmetic/Logic Units, floating point Arithmetic/Logic Units, and Graphical Logic Units that operate in parallel. In a processor architecture, an operating system controls operation of the processor and components peripheral to the processor. Executable application programs are stored in a computer's hard drive. The computer's processor causes application programs to run in response to user inputs.

Thus, in a modern system, a plurality of computers—including servers—are connected together through a network. Each computer may run application programs for performing certain functions. These application programs may include word-processing, e-mail, graphics, document viewing and mark-up, spreadsheet, database, music player, internet explorer, photo-shop, games, anti-virus, as well as a host of other application programs too numerous to mention. Many application programs perform encryption and/or decryption of program data. For example, an email sender may encrypt an email before sending it out to the recipient A recipient of the encrypted email will need to decrypt the received encrypted email from the sender. In another application, a sender may digitally sign a document before sending it. The operation of digital signing involves encryption. The digital signature can be verified by encryption also. Other examples of the use of encryption by application programs abound.

To perform encryption and/or decryption, the application program must have a key and must follow a known algorithm for performing the encryption/decryption using the key. Thus, an application program may deal with sensitive data calling for encryption. For example, an application program may encrypt a file. The encrypted file prevents one without a key from reading the file. The data in the file may also be signed. When data is signed it cannot be modified without detection.

With the advent of the internet and wide spread use of computers, more and more commercial transactions occur electronically. To facilitate this "e-commerce," computing networks employ encryption and digital signatures. Encryption enables a user to conceal messages transmitted over a network. Decryption enables recovery of the original message from its encrypted counterpart. Digital signatures enable the user to sign documents electronically. Forming a digital signature involves encryption in a public key cryptography system. The system employs an algorithm using two different but mathematically related "keys;" one for creating a digital signature and another for verifying a digital signature. Computer equipment and software utilizing two such keys are often collectively termed an "asymmetric cryptosystem."

The complementary keys of an asymmetric cryptosystem for digital signatures are termed the private key and the public key. The signer uses the private key to create the digital signature. Ideally, only the signer can access his private key. The public key is ordinarily more widely known. A party to rely on the signature uses the public key to verify the digital signature. Although the keys of the pair are mathematically related, it is computationally infeasible to derive the private key from the public key. Thus, although many people may know the public key of a given signer and can use it to verify that signer's signature, they cannot access the signer's private key to forge the signer's digital signature. This is the principle of "irreversibility."

A fundamental process to create and verify digital signatures is a "hash function." A hash function is an algorithm that creates a digital representation or "fingerprint" in the form of a "hash result." The hash result is usually much smaller than the message but is, nevertheless, substantially unique to it. This hash result is encrypted using the signer's private key to create the digital signature. Any change to the message invariably produces a different hash result when the same hash function is used. For a secure hash function, it is computationally infeasible to derive the original message from its hash value. Hash functions therefore enable the software for creating digital signatures to operate on smaller and predictable amounts of data, while still providing robust evidentiary correlation to the original message content.

To sign a document or any other item of information, the signer first delimits precisely the borders of what is to be signed. The delimited information to be signed is termed the "message." Then a hash function in the signer's software computes a hash result unique (for all practical purposes) to the message. The signer's software then encrypts the hash result into a digital signature using the signer's private key. The resulting digital signature is thus unique to both the message and the private key used to create it.

When a signer sends a signed message, the unsigned message is also sent. The recipient verifies the signature by using the user's public key to decrypt the encrypted hash. The recipient also hashes the unsigned message. The two hash results are then compared. The signature is verified only if the two hash results are the same. The equality of the hash results means that the message signed by the sender is the one received by the recipient. Then, the sender cannot repudiate that he signed the message received and verified by the recipient. The verifier of a digital signature must have assurance that the signature was made by a particular person. This assurance arises from a trusted third party that issues a certificate that certifies that signatures that can be verified using the public key specified in the certificate belong to the party identified in the certificate.

Thus, many application programs must have keys to encrypt and sign documents, files, and blocks of data. Methods for managing and generating such keys are needed.

SUMMARY

The present invention provides systems, methods and media for managing and generating keys for encryption. In one embodiment, an encryption key management system comprises a key manager. The key manager determines which the key belongs when an application program requesting one or more keys is authorized to receive the one or more keys and to produce a map of the one or more keys, wherein the key manager is responsive to a request from the application program for all keys in a key set or a key set group to produce a map of all keys in the key set or the key set group, respectively, and the key manager is responsive to a request for latest versions of keys in the key set or key set group to produce a map of the latest versions of keys in the key set or the key set group, respectively, wherein the map of all keys comprises a map with the latest versions of keys and earlier versions of keys and wherein the latest versions of keys comprises versions of keys last generated at a scheduled key generation event, wherein the key manager is to determine whether the application program is within a scope specified for the key set, the scope being the scope of authorized access to the key set, wherein determining whether the application program is within the scope specified for the key set comprises determining whether the application program is associated with a grouping that is associated with the key set. The system comprises a key scheduler to schedule at least one key generation event at a pre-determinable time. The system also comprises a key generator to generate at least one key of the one or more keys at a scheduled key generation event wherein keys generated by the key generator are associated with a key set and a key set group and wherein the key set comprises one or more keys and the key set group comprises one or more key sets. And the system comprises a key store comprising memory to store the at least one key along with attributes of the at least one key so that each key is associated with a set of attributes of the key.

Embodiments include a method for managing and generating keys. The method comprises receiving, by an encryption key processor, a call from an application program to provide at least one key associated with a key set or key set group, wherein a key set comprises at least one key and a key set group comprises at least one key set. The method involves determining, by the encryption key processor, if the application program is within a scope specified for the associated key set or key set group, the scope being the scope of authorized access to the key set or key set group, wherein determining if the application program is within the scope specified for the key set or key set group comprises determining whether the application program is associated with a grouping that is associated with the key set or key set group. The method involves, if the application is within the scope, then producing, by the encryption key processor, a map of the at least one key associated with the key set or key set group, wherein producing the map comprises producing a map of all keys in the key set or the key set group responsive to a request from the application program for all keys in the key set or the key set group, respectively, and producing a map of the latest versions of keys in the key set or the key set group responsive to a request for latest versions of keys in the key set or key set group, respectively, wherein the map of all keys comprises a map with the latest versions of keys and earlier versions of keys and wherein the latest versions of keys comprises versions of keys last generated at a scheduled key generation event. And the method involves generating, by the encryption key processor, the at least one key to include in the key set or key set group according to a specifiable schedule.

Another embodiment of the invention provides computer program product comprising a non-transitory computer useable storage medium having a computer readable program. The computer readable program when executed on a computer causes the computer to receive a request from an application program to provide one or more keys in a key set or key set group, wherein a key set comprises at least one key and a key set group comprises at least one key set. The computer readable program when executed on a computer causes the computer to determine if the application program is within a scope specified for the key set or key set group, the scope being the scope of authorized access to the key set or key set group, wherein determining if the application program is within the scope specified for the key set or key set group comprises determining whether the application program is associated with a grouping that is associated with the key set or key set group. The computer readable program when executed on a computer causes the computer to, if the application is within the specified scope, then produce a map of the one or more keys, wherein producing the map comprises producing a map of all keys in the key set or the key set group responsive to a request from the application program for all keys in the key set or the key set group, respectively, and producing a map of the latest versions of keys in the key set or the key set group responsive to a request for latest versions of keys in the key set or key set group, respectively, wherein the map of all keys comprises a map with the latest versions of keys and earlier versions of keys and wherein the latest versions of keys comprises versions of keys last generated at a scheduled key generation event. And, the computer readable program when executed on a computer causes the computer to generate new keys for a key set according to a predetermined schedule.

BRIEF DESCRIPTION OF THE DRAWINGS

Advantages of the invention will become apparent upon reading the following detailed description and upon reference to the accompanying drawings in which, like references may indicate similar elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed description below is designed to render various embodiments obvious to a person of ordinary skill in the art.

Systems, methods and media for managing and generating encryption keys are disclosed. In one embodiment, a processor executes encryption key processing computer code to receive requests for keys from an application program. The processor determines whether the requesting application program executes on a node or server that is within the scope of machines authorized to receive the requested keys. If so, the processor produces a key map and sends the key map to the application program, enabling the application program to get one or more keys in the key map. The keys are updated automatically according to a specifiable schedule. Thus, the application program may receive the most recent keys and/or older keys. Keys may be generated according to a schedule to ensure that they are sufficiently new so that no brute force attack can figure them out. This also allows the system to change the keys more regularly which may allow for smaller key lengths improving encryption performance yet still maintaining a high level of security.

Figure 1:
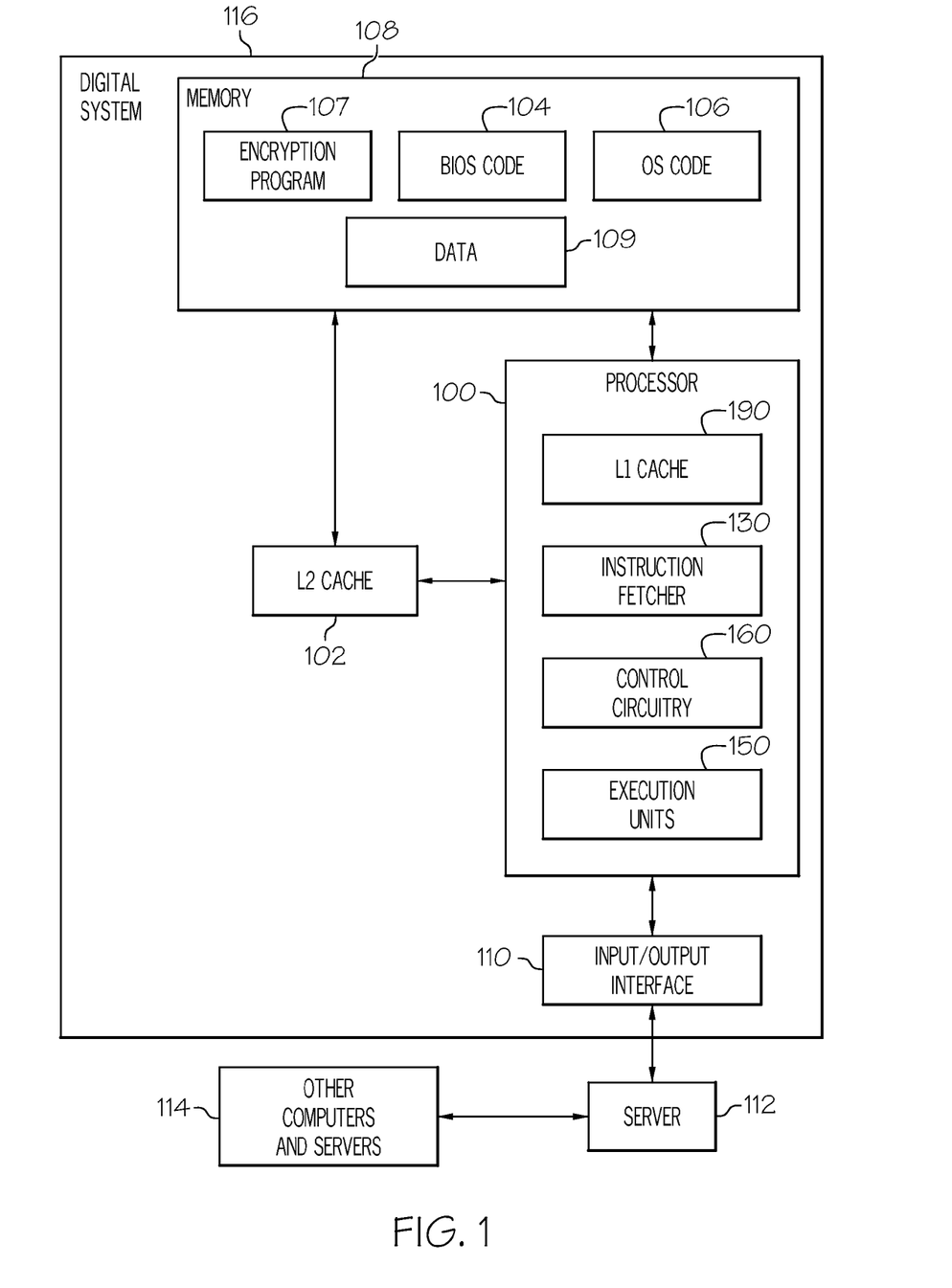
FIG. 1 depicts an embodiment of a digital system within a network; the digital system can execute encryption key management software.

FIG. 1 shows a digital system 116 (herein sometimes referred to as a machine) such as a computer or server implemented according to one embodiment of the present invention. Digital system 116 comprises a processor 100 that can operate according to BIOS (Basis Input/Output System) Code 104 and Operating System (OS) Code 106. The BIOS and OS code is stored in memory 108. The BIOS code is typically stored on Read-Only Memory (ROM) and the OS code is typically stored on the hard drive of computer system 116. Digital system 116 comprises a level 2 (L2) cache 102 located physically close to processor 100. Memory 108 also stores other programs for execution by processor 100 and stores data 109.

In an embodiment, memory 108 stores computer code 107 to manage and generate encryption keys, as will be described herein. This computer code causes the processor to execute instructions to implement a variety of encryption key management and encryption key generation functions. For example, processor 100 executes code to produce a set of keys in a key set or key set group. Processor 100 also executes code to associate a key with its various attributes. Processor 100 also executes code to determine if an application that calls for keys is within a specified scope. Processor 100 also determines a time for a key generation event.

Processor 100 comprises an on-chip level one (L1) cache 190, an instruction fetcher 130, control circuitry 160, and execution units 150. Level 1 cache 190 receives and stores instructions that are near to time of execution. Instruction fetcher 130 fetches instructions from memory. Execution units 150 perform the operations called for by the instructions. In one embodiment, these instructions include instructions to identify a key set or key set group named by an interface module. The instructions cause processor 100 to determine if the requesting application program is authorized to receive the requested keys. The instructions further cause processor 100 to retrieve the requested keys from a key store and to thereby produce a map of the keys.

Execution units 150 may comprise load/store units, integer Arithmetic/Logic Units, floating point Arithmetic/Logic Units, and Graphical Logic Units. Each execution unit comprises stages to perform steps in the execution of the instructions fetched by instruction fetcher 130. In a superscalar architecture, different execution units operate in parallel. Thus, execution units 150 comprise a set of units of different types operating in parallel to execute instructions to implement an encryption key management process.

Control circuitry 160 controls instruction fetcher 130 and execution units 150. Control circuitry 160 also receives information relevant to control decisions from execution units 150. For example, control circuitry 160 is notified in the event of a data cache miss in the execution pipeline to process a stall.

Digital system 116 also typically includes other components and subsystems not shown, such as: a Trusted Platform Module, memory controllers, random access memory (RAM), peripheral drivers, a system monitor, a keyboard, a color video monitor, one or more flexible diskette drives, one or more removable non-volatile media drives such as a fixed disk hard drive, CD and DVD drives, a pointing device such as a mouse, and a network interface adapter, etc. Digital systems 116 may include personal computers, workstations, servers, mainframe computers, notebook or laptop computers, desktop computers, or the like. Processor 100 may also communicate with a server 112 by way of Input/Output Device 110. Server 112 connects system 116 with other computers and servers 114. Thus, digital system 116 may be in a network of computers such as the Internet and/or a local intranet. Further, server 112 may control access to other memory comprising tape drive storage, hard disk arrays, RAM, ROM, etc.

Thus, in one mode of operation of digital system 116, the L2 cache receives from memory 108 data and instructions expected to be processed in the processor pipeline of processor 100. L2 cache 102 is fast memory located physically close to processor 100 to achieve greater speed. The L2 cache receives from memory 108 the instructions for a plurality of instruction threads. Such instructions may include load and store instructions, branch instructions, arithmetic logic instructions, floating point instructions, etc. The L1 cache 190 is located in the processor and contains data and instructions preferably received from L2 cache 102. Ideally, as the time approaches for a program instruction to be executed, the instruction is passed with its data, if any, first to the L2 cache, and then as execution time is near imminent, to the L1 cache.

Execution units 150 execute the instructions received from the L1 cache 190. Each of the units of execution units 150 may be adapted to execute a specific set of instructions. Instructions can be submitted to different execution units for execution in parallel. Data processed by execution units 150 are storable in and accessible from integer register files and floating point register files (not shown.) Data stored in these register files can also come from or be transferred to on-board L1 cache 190 or an external cache or memory. The processor can load data from memory, such as L1 cache, to a register of the processor by executing a load instruction. The processor can store data into memory from a register by executing a store instruction.

A digital system 116 will have its own memory for storing its operating system, BIOS, and the code for executing application program and encryption key processing code, as well as files and data. The memory of a computer comprises Read-Only-Memory (ROM), cache memory implemented in DRAM and SRAM, a hard disk drive, CD drives and DVD drives. A server also has its own memory and may control access to other memory such as tape drives and hard disk arrays. Each computer may store and execute its own application programs. Some application programs, such as databases, may reside in the server. Thus, each computer may access the same database stored in a server. In addition, each computer may access other memory by way of a server.

Figure 2:
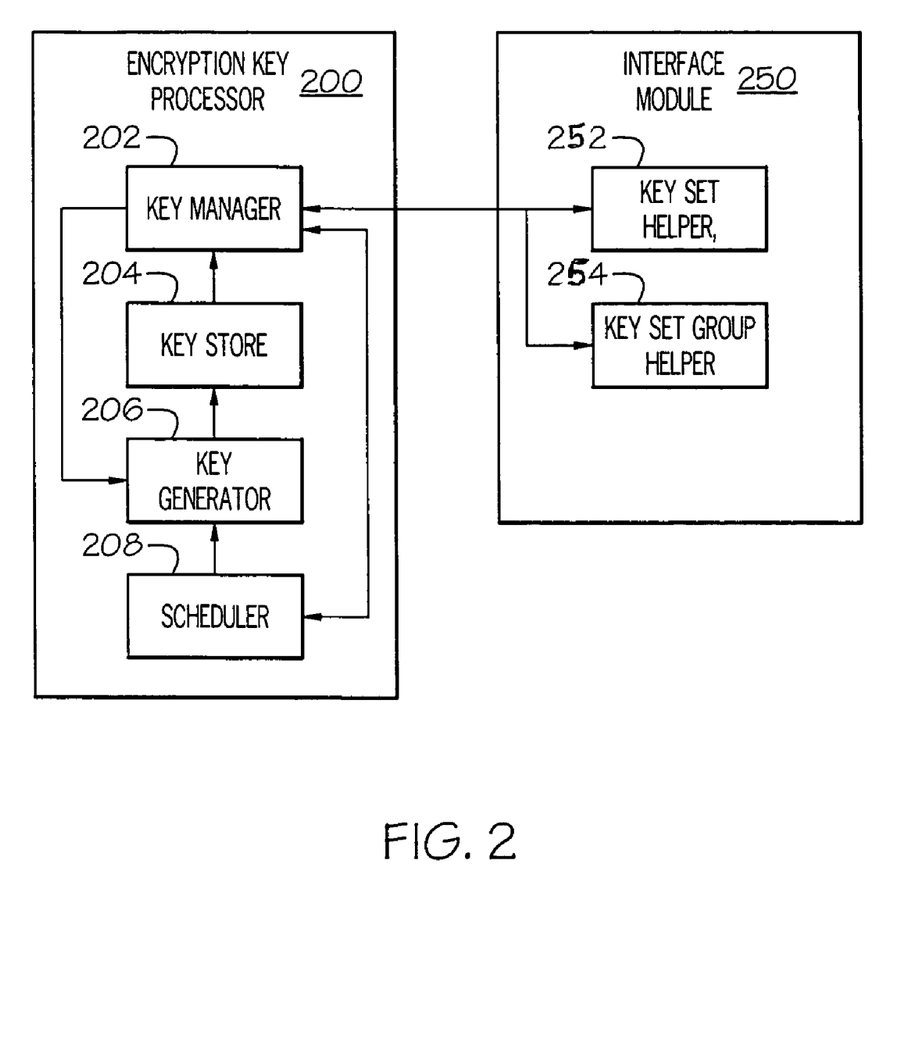
FIG. 2 depicts an embodiment of an encryption key processor in communication with an interface module.

A machine 116 may store computer code 107 for managing and generating keys. This computer code is executed by processor 100 to generate, specify, and provide limited access to encryption keys generated according to a schedule. FIG. 2 shows a block diagram of an embodiment for managing, generating, and communicating keys. There is an encryption key processor 200 for managing and generating encryption keys. There is also an interface module 250 in communication with encryption key processor 200. The encryption key processor is a processor that executes computer code for managing and generating encryption keys and communicating these keys to the requesting interface module. The interface module is computer code executed by a processor to provide an interface between a running application program and the rest of the system. In the course of operation, the application program using the interface module may request encryption keys from the encryption key processor for encrypting and/or digital signing.

In one embodiment, the encryption key processing software is executed by the same processor that executes the interface module software. The encryption key processor operates in the background. In another embodiment, the encryption key processing software runs on the processor of one digital system whereas the interface module software runs on the processor of a different digital system. Thus, the encryption key processor can manage keys for a plurality of other computers and servers and determine which computers and servers are entitled to a requested key.

Encryption key processor 200 comprises a key manager 202. Key manager 202 performs a variety of functions relating to the generation and management of keys. One function of key manager 202 is to associate keys with their respective attributes as specified by a system administrator. Attributes of a key include the name of the key set to which the key belongs, an alias for the key, a password for the key, a number of key references to be tracked, the scope of access to the key, etc. When a request for one or more keys is received from an application through an interface module, a call is made to a method executed by key manager 202 to produce a map of the available keys within a specified key set or key set group. But first, key manager 202 determines if the requesting machine is authorized to receive the one or more keys requested. If so, then a map of available keys is produced. Interface module 250 then identifies the key in the map that it needs. If the requesting machine is not within the scope specified for the requested keys, then key manager 202 sends a message to the requesting interface module that the request is not authorized.

Key store 204 stores both keys and key aliases. Key store 204 may store at least two types of keys. One type is a single key that is used for both encryption and decryption of data. This type of key is referred to herein as a secret key. Key store 204 also stores key pairs for a public/private encryption system. In such a system, one key of a key pair is a private key and another key of the key pair is the public key. The private key is kept secret by its owner and is used by the owner to encrypt and/or sign data. The public key is more widely known than the private key and can be used to decrypt the data and verify a signature. Key store 204 also stores attributes associated with each key by key manager 202. These attributes include the key alias, the key set name, and key set group name. Note that key store 204 may be a memory in the same machine that executes the encryption key software, as shown in FIG. 2, or the key store may be a memory located in another machine. If the key store is remote, the key manager has information about the remote machine to make a remote call to the key store where it is physically located and retrieve the keys needed.

Key manager 202 is capable of calling for the generation of a secret key or a public/private key pair. The generation of a key or key pair is performed by a key generator 206. New keys can be generated by calling key generator 206 according to a schedule implemented by a scheduler 208. Scheduler 208 determines a time for a next key generation event according to a frequency specification received from key manager 202. When time arrives for a key generation event, scheduler 208 causes the key generator 206 to generate new keys, and notifies key manager 202 of the event.

Key generator 206 may comprise a first key generator for generating a secret key, and a second key generator for generating a public/private key pair. In other words, the secret key and the public/private key pair are generated by two different algorithms. Key store 204 receives the keys from key generator 206 and stores them. Key manager 202 calls key generator 206 periodically according to a schedule determined by parameters specified by an authorized person. Thus, in one embodiment the authorized person can specify the frequency (how many days between key generation events), and the day of the week and hour of the day to generate new keys.

As noted, the encryption key processor 200 can be performed in the same machine that performs the interface module 250, or can be performed in a different machine. The process of interface module 250 is implemented by a processor such as that shown in FIG. 1. Interface module 250 comprises a key set helper 252 and a key set group helper 254. Key set helper 252 is a process for obtaining access to the keys in a key set. Key set group helper 254 is a process for obtaining access to the keys in a key set group. For example, key set helper 252 may request, on behalf of the overlaying application program, a latest version of a secret key. Interface module 250 sends this request to encryption key processor 200. Key manager 202 determines whether the requesting application program is authorized to receive the requested key. Key manager 202 may then retrieve the latest version of the requested key. In one embodiment, the interface module 250 can request, and the key manager 202 can deliver, a key that is an earlier version. The number of earlier versions that the encryption key process tracks is specified by the authorized person. This makes it possible for the application program to decrypt data that was encrypted with an old key.

Thus, an encryption key processor manages encryption keys. The encryption key processor receives a call from an application program to a get key method. The call to the get key method specifies the name of a key set or key set group. Each key set has at least one key, and each key set group has at least one key set. Before executing the get key method, the encryption key processor determines if the requesting application program is within a scope specified for the named key set or key set group. If the application program is within the specified scope, then the encryption key processor produces a map of the requested keys. For example, one get key method calls for all the keys in a key set group. The encryption key processor would thus produce a map of all the keys in the key set group. This map is sent to the application program through the interface module. The application program can then select any one or more of the keys in the map.

A Key Set is made up of Key References. A key reference uses an alias to refer to an actual encryption key. An alias is a short-hand name for a key. Each key has an alias that refers to it. The actual keys are stored in a key store and may be retrieved by calling the key by its alias. The following blocks of code specify a key pair key set.

```
<keySets xmi:id="KeySet_BIRKT40Node01_1"
    name="NodeLTPAKeyPair" aliasPrefix="LTPAKeyPair"
```

This block of code creates or specifies a key set and identifies the key set by name. The code also specifies an alias prefix. The alias prefix prefixes a key alias. Thus, keys in the key set will be associated with the specified prefix.

The following block specifies a password, the maximum number of key references to be tracked, and an attribute indicating whether old keys are to be deleted.

```
password="{xor}HRYNFAtrbxEwOzpvbhw6MzM="
maxKeyReferences="2"
deleteOldKeys="true"
```

The password can be specified at the KeySet level where then all keys in the key set have the same password, or at the KeyReference level where then each key has a password associated there with. The maximum number of key references tracked at any given time is specified by the maxKeyReferences attribute. This variable stores the number of keys to be tracked. Once the maximum number of keys to be tracked is reached, then at the next key generation event, the oldest key reference is removed and a new key reference is added. When, for example, the maxKeyReference is 2, the key sets will only have two key references at any point in time. If the deleteOldKeys attribute is true, then the old keys are removed from the KeyStore referenced by the keyStore attribute. The keyStore attribute specifies the key store where the keys are stored.

The following block specifies a key type, and determines a location of a key store for the key set.

```
keyGenerationClass="com.ibm.ws.security.ltpa.LTPAKeyPairGenerator"
isKeyPair="true"
keyStore="KeyStore_BIRKT40Node01_3"
```

The keys are generated by an application-specific class referenced by the keyGenerationClass attribute. This class implements either a KeyGenerator or KeyPairGenerator interface depending upon whether the isKeyPair attribute is true or false.

The following block specifies a management scope.

```
<managementScopes xmi:id="ManagementScope_BIRKT40Node01_1"
scopeName="(cell):BIRKT40Node01Cell:(node):BIRKT40Node01"
scopeType="node"/>
```

The management scope specified by the KeySet points to the cell name and node name of the node to which the KeySet is visible. This visibility has inheritance traits such that any members (Application Servers) of that node can view these keys. However, members of other nodes cannot view these keys. In one embodiment, the management scope can be set to a single server.

The following block specifies a key reference with an alias:

```
<keyReference xmi:id="KeyReference_1128391356884"
    keyAlias="LTPAKeyPair_8" version="8"/>
<keyReference xmi:id="KeyReference_1128433215373"
    keyAlias="LTPAKeyPair_9" version="9"/>
```

These two blocks of code each specify a key by specifying a key reference, a key alias, and a key version. When a new key is generated, the version # in the key reference is incremented and the key alias as stored in the KeyStore is prefixed by the aliasPrefix attribute. Thus, a Key Set is made up of Key References. A key reference uses an alias to refer to an actual encryption key. An alias is a short-hand name for a key. Each key has an alias that refers to it. The actual keys are stored in the key store and may be retrieved by calling the key by its alias.

```
</keySets>
```

This ends the block of code that specifies a key pair set.

The following blocks of code specify a Secret Key Keyset:

```
<keySets xmi:id="KeySet_BIRKT40Node01_2"
    name="NodeLTPASecret" aliasPrefix="LTPASecret"
    password="{xor}HRYNFAtrbxEwOzpvbhw6MzM="
    maxKeyReferences="2"
    deleteOldKeys="true"
    keyGenerationClass="com.ibm.ws.security.ltpa.LTPAKeyGenerator"
    keyStore="KeyStore_BIRKT40Node01_3"
    managementScope="ManagementScope_BIRKT40Node01_1">
    <keyReference xmi:id="KeyReference_1128391359568"
        keyAlias="LTPASecret_8" version="8"/>
    <keyReference xmi:id="KeyReference_1128433217215"
        keyAlias="LTPASecret_9" version="9"/>
</keySets>
```

Key sets can be grouped together and managed as a single entity. This is called a KeySetGroup defined by the following blocks of code:

```
<keySetGroups xmi:id="KeySetGroup_BIRKT40Node01_1"
    name="NodeLTPAKeySetGroup"
    autoGenerate="true"
```

This code creates or specifies a key set group and identifies it with a name. The autoGenerate attribute specifies whether a replacement key will be generated to replace a key according to a schedule.

The following block specifies an attribute that references a schedule object.

```
wsSchedule="WSSchedule_BIRKT40Node01_1"
```

The following block specifies which key sets belong in the group.

```
keySet="KeySet_BIRKT40Node01_1
    KeySet_BIRKT40Node01_2"
```

The following block specifies the scope of access to the keys in the key set group.

```
managementScope="ManagementScope_BIRKT40Node01_1"/>
```

Thus, the KeySetGroup defined above is itself scoped but must be at least equivalent or more specific than the KeySets it groups (e.g., a Node scoped KeySetGroup cannot contain a Server scoped KeySet). In one embodiment, a KeySet must be a member of a KeySetGroup in order to configure auto key generation. A KeySetGroup may contain one or more KeySets.

The wsSchedule attribute references the schedule object which determines when to kick off the next key generation event. A key generation event for a KeySetGroup calls the generateKey or generateKeyPair methods for each key set keyGenerationClass. This will produce a new version key for each KeySet (and potentially the oldest version is no longer part of the key set). An example schedule is shown as follows:

```
<wsSchedules xmi:id="WSSchedule_BIRKT40Node01_1"
name="LTPAKeySetGenerationSchedule"
frequency="90"
dayOfWeek="1"
hour="22"
minute="00"
nextGenerationTime="1136174401335"/>
```

This can be used to generate a date in the future at which the next key generation event will occur. This date is persisted in a nextGenerationTime attribute. Once this date and time elapse, a new date and time is generated based on the frequency: dayOfWeek, hour and minute.

The KeyPair generation interface is implemented by a keyGenerationClass where the isKeyPair attribute is "true". This is used to generate Public/Private key pairs typically used for signing. The key pair can be a java.security.PublicKey and a java.security.Private key. Or the key pair can be a java.security.cert.Certificate (containing a java.security.PublicKey) and java.security.PrivateKey. Thus, there exists a key pair generation method:

generateKeyPair( );

The key manager will execute this method whenever a key pair must be generated, either at the scheduled time or by manual request. Similarly, there exists a secret key generation method:

generateKey( );

An associated method is:

void init(java.util.Properties customProps).

The key manager executes this method to pass any custom properties configured with the KeySet to the interface module. The following lines of code are examples that specify custom properties:

```
<properties xmi:id="Property_1" name="key_length" value="1024"
required="false"/>
<properties xmi:id="Property_1" name="key_algorithm"
value="RSA" required="false"/>
```

The first of these example property specifications specifies a key length property with a key length value of 1024. The second property specification specifies the algorithm by which the key is generated, in this case RSA, (where RSA is an algorithm named after the inventors Rivest, Shamir, and Adleman.) The required attribute indicates whether there must be a value specified.

Figure 2A:
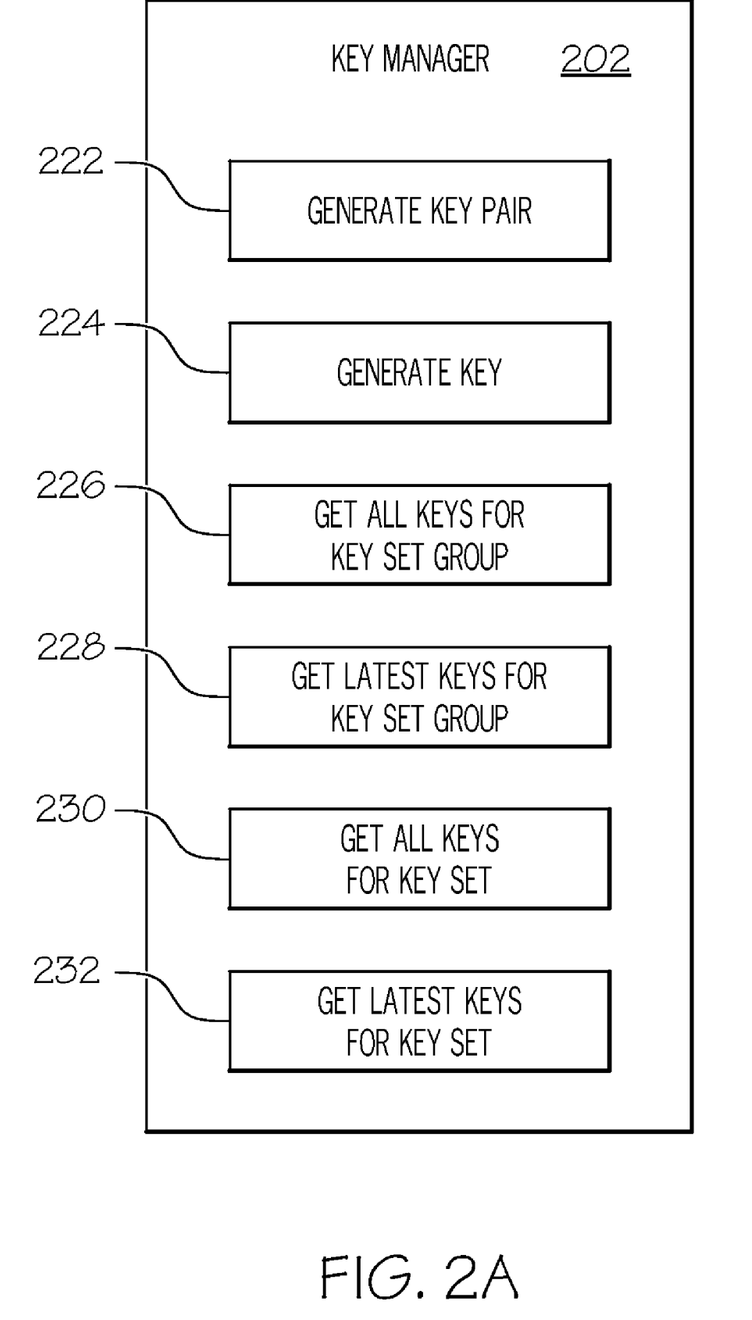
FIG. 2A depicts a block diagram of a key manager.

FIG. 2A shows a block diagram of key manager 202 which comprises the generate-key 224 and generate-key-pair 222 methods described above. Key manager 202 also comprises methods for recalling requested keys from the key store. Thus, the key set group helper will call, and the key manager will execute, the following method to obtain a key map of all keys in a key set group:

getAllKeysForKeySetGroup (element 226);

which is implemented by the call:

public java.util.Map getAllKeysForKeySetGroup
(java.lang.String keySetGroupName) throws
KeyException, java.lang.SecurityException Recall that a key set group contains the keys of each of one or more key sets. Each key set has one or more keys. In the call of this method, the key set group helper must specify the key set group name. The encryption key manager determines if the interface module that calls the method is within the management scope for the specified key set group.

The keys in the specified group are secret keys and/or public/private key pairs. When a secret key is returned to an interface module, the interface module takes no cognizance of the key type or algorithm. It merely passes the keys from the key manager to the application program. The application program knows the key type and algorithm for its use. Examples of keys in a map, sorted by version are:

```
{version_2={ LTPASecret_2=javax.crypto.spec.SecretKeySpec@16833,
LTPAKeyPair_2=com.ibm.websphere.crypto.KeyPair@5e225e22},
version_3={ LTPASecret_3=javax.crypto.spec.
SecretKeySpec@fffe8b59,
LTPAKeyPair_3=com.ibm.websphere.crypto.KeyPair@1cec1cec},
version_4={ LTPAKeyPair_4=com.ibm.websphere.crypto.
KeyPair@5bd45bd4,
LTPASecret_4=javax.crypto.spec.
SecretKeySpec@1781d}}
```

The method returns a map of key references of keys in the key sets of the key set group. Each entry has a key alias, (e.g., LTPAKeyPair_2), and a key. In one embodiment, the aliases are hashed to produce a hash object. The map is sent to the interface module which transfers the map to the overlaying application program that is running on the same processor as the interface module. Upon receiving the map, the application program can search it to choose the desired key. For example, if the application program wants the oldest secret key in the group, and the list is in chronological order, it will simply choose the first secret key entry in the list.

The key set group helper will call, and the key manager will execute, the following method to retrieve the latest keys in a key set group.

getLatestKeysForKeySetGroup (element 228);

A key set group has the latest versions of the keys within the group and may retain earlier versions of keys in the group. This method returns a map of the key references of the latest keys only. Examples of these references are:

```
{LTPAKeyPair_4=com.ibm.websphere.crypto.KeyPair@5bd45bd4,
LTPASecret_4=javax.crypto.spec.SecretKeySpec@1781d}
```

The key set helper will call, and the key manager will execute, the following method to retrieve all the keys of a key set:

getAllKeysForKeySet (element 230);

This method returns a map of all the keys in a key set. Examples of keys from KeySet name "CellLTPASecret" are:

```
{LTPASecret_2=javax.crypto.spec.SecretKeySpec@16833,
LTPASecret_3=javax.crypto.spec.SecretKeySpec@fffe8b59,}
```

Example of keys from KeySet name "CellLTPAKeyPair" are:

```
{LTPAKeyPair_4=com.ibm.websphere.crypto.KeyPair@5bd45bd4,
LTPAKeyPair_2=com.ibm.websphere.crypto.KeyPair@5e225e22,
LTPAKeyPair_3=com.ibm.websphere.crypto.KeyPair@1cec1cec}
```

The key set helper will call, and the key manager will execute, the following method to get the latest key from a key set:

```
getLatestKeyForKeySet (element 232);
```

This method returns an object containing either a java security key instance or an IBM websphere.crypto key pair instance, depending upon the KeySet type. Thus, the method can return a secret key or a key pair. A key pair may be a public key and a private key or a certificate and a private key. The format of the object returned by this method may depend upon the key type. An example of a latest key from KeySet name "CellLTPASecret" is:

```
javax.crypto.spec.SecretKeySpec@1781d
```

An example of a latest key from KeySet name "CellLTPAKeyPair" is:

```
com.ibm.websphere.crypto.KeyPair@5bd45bd4
```

Figure 3:
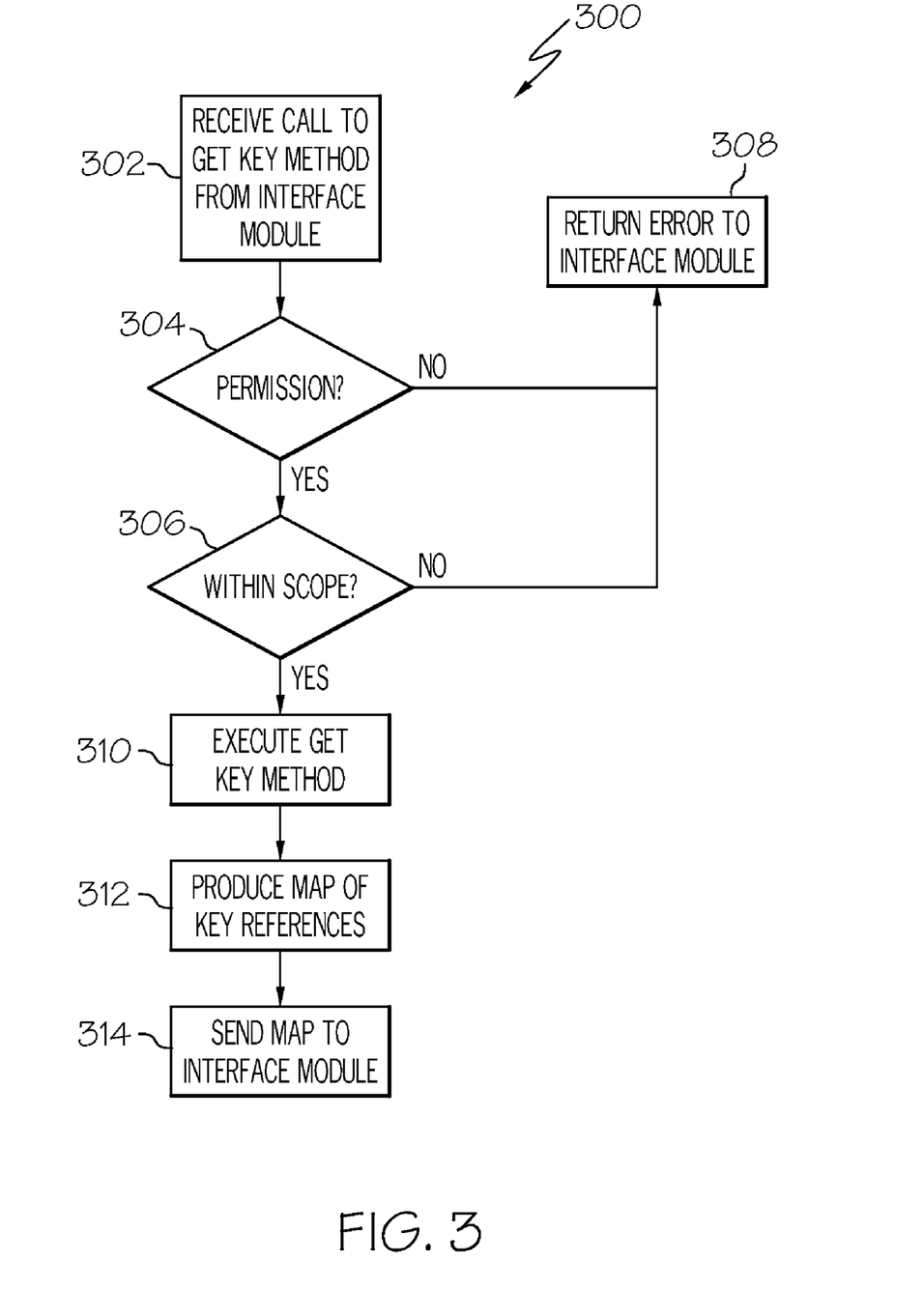
FIG. 3 depicts a flowchart of an embodiment for retrieving keys requested by an application program.

FIG. 3 shows an embodiment of a flow chart 300 for operation of an encryption key processor as described above. The encryption key processor receives a call from the interface module to a method to get keys in a key set or key set group (element 302). For example, the interface module may call the method to get the latest keys of a key set group, getLatestKeysForKeySetGroup. When Java 2 security is enabled, access to call this method requires permission (element 304). If permission is not granted, the key manager returns an error to the requesting interface module (element 308). If permission is granted, then the key manager determines if the requesting machine is within the specified management scope of machines for access to the requested keys (element 306). Thus, for example, a server that executes the application program may be part of a node that is specified in the management scope attribute of the requested keys. If so, the encryption key processor will proceed to the step of executing the called get key method (element 310). If not, the key manager returns to the interface module an error (element 308).

The called get key method to be executed (element 310) may be one of a plurality of get key methods including those described above. Execution of the called get key method produces a map of key(s) in the key set or key set group specified in the get key method. In one embodiment, the elements of this map—which contains the key references to the requested keys—are hashed to produce a hash map (element 312). The encryption key processor sends the map to the interface module (element 314) which passes the map to the application program. The application program then selects one or more desired keys from the map. For example, the application program may select from the map a key of a given alias. Or the application may search the map for a specific version of a secret key or public/private key pair.

Figure 4:
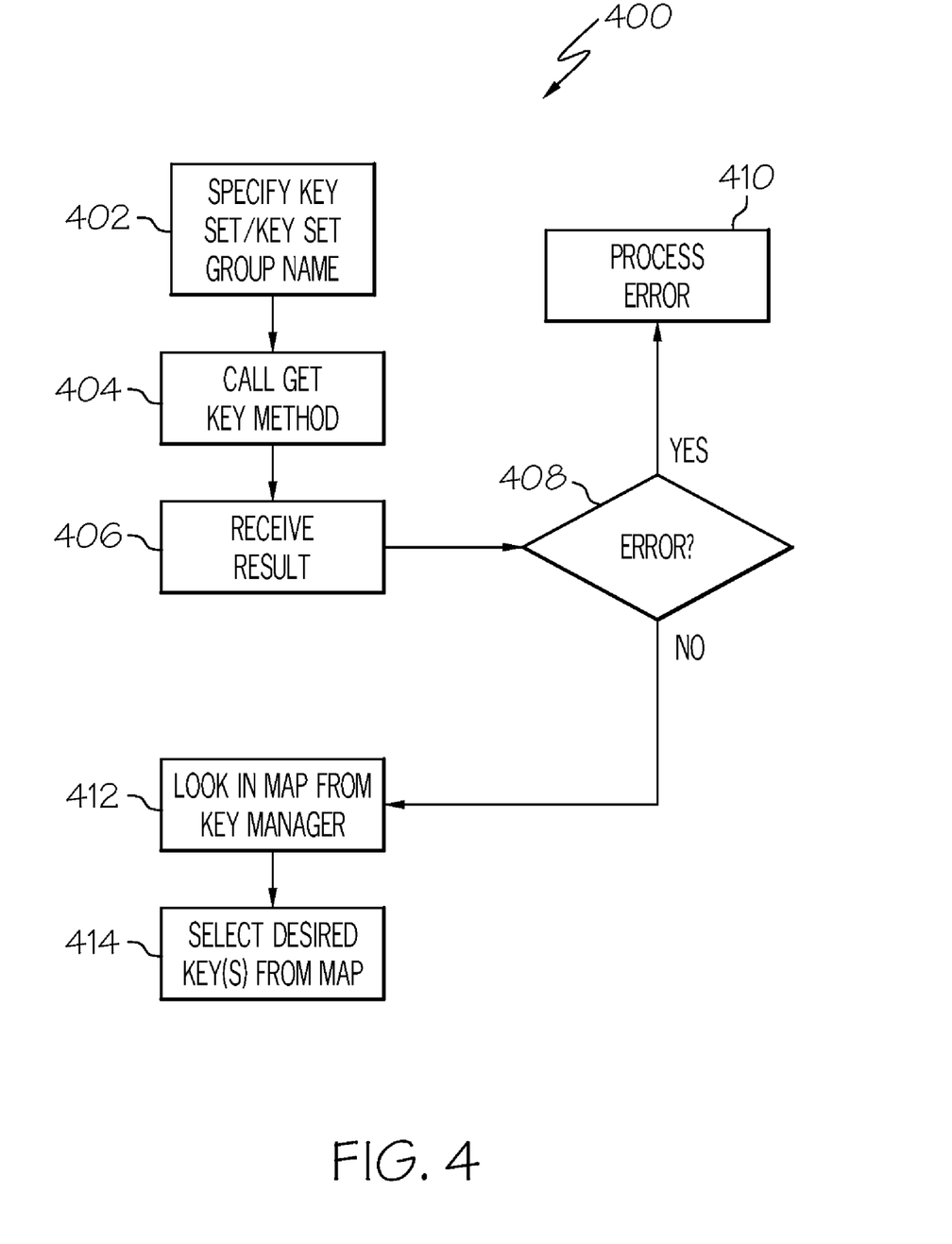
FIG. 4 depicts a flowchart of an embodiment for operation of an interface module for calling and selecting keys.

FIG. 4 shows an embodiment of a flow chart 400 for operation of an interface module and the application program that uses it. When an application program needs a key, the application program specifies the key set or key set group name to which the key belongs (element 402). Either the key set group helper or the key set helper of the interface module will call a get key method that delivers a map of the specified key set group or key set or subgroup of the specified key set group or key set (element 404). In response to the called get key method, the key manager will deliver, and the interface module will receive, a result that, in one embodiment, may be an error or the requested key map (element 406).

If the key manager returns an error (element 408), the application program processes the error (element 410). Processing the error may comprise displaying a window on a video monitor that contains a message such as "Permission Denied." If the key manager returns a map, the key set helper or key set group helper passes the map to the application program. The application program looks in the map provided by the key manager for the desired key(s) (element 412). Then, the application program selects the desired one or more keys from the map (element 414). For example, the application program might first select an oldest secret key for decrypting a file. Then, the application might select a newest key pair for digitally signing a document.

Figure 5:
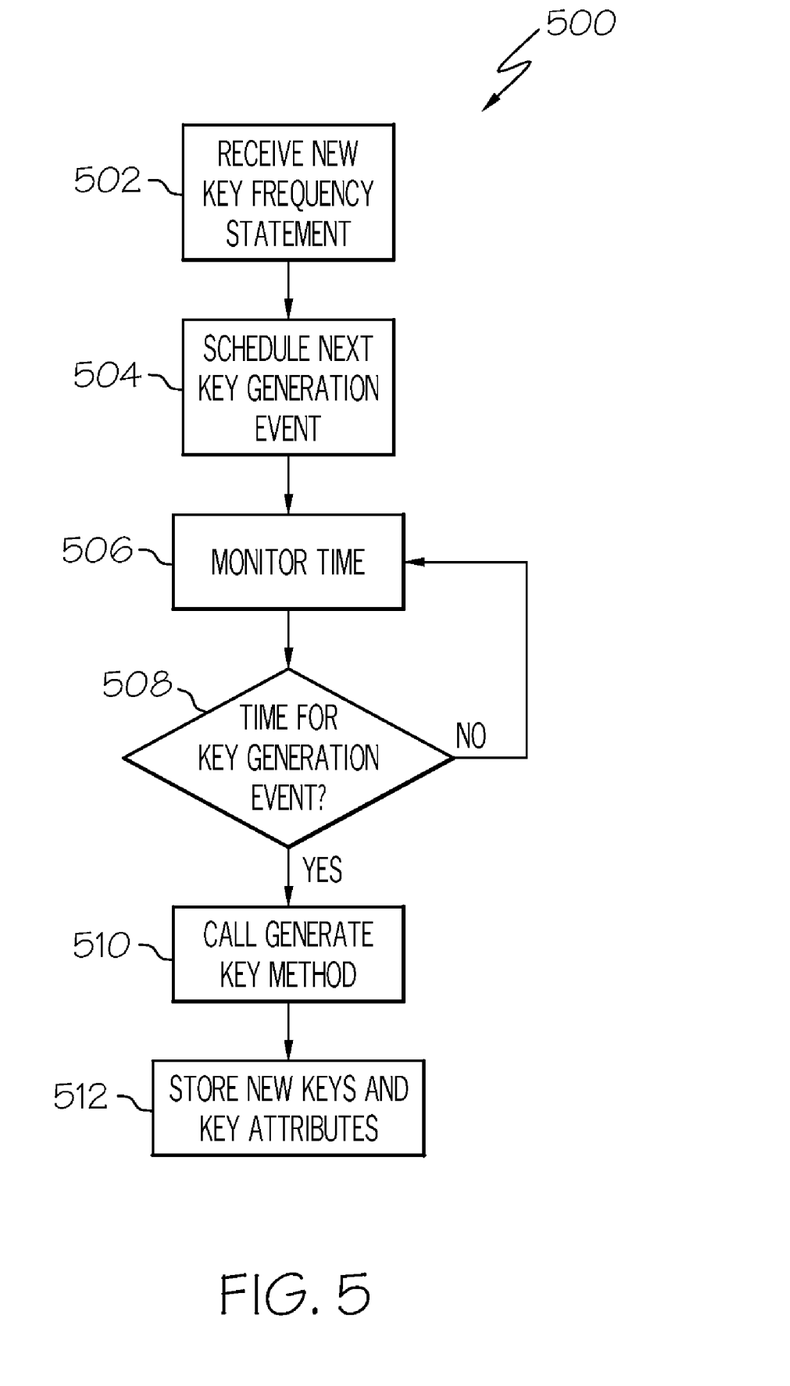
FIG. 5 depicts a flowchart of an embodiment for generating new keys according to a schedule.

FIG. 5 shows an embodiment of a flow chart 500 for scheduling generation of keys. Upon initiation of execution of encryption key processor software, a key generation frequency statement is received and executed to determine a specified frequency for generating new keys (element 502). With this information, the encryption key processor schedules a next key generation event (element 504). The system monitors the time (element 506) to determine if time is now for a key generation event (element 508). If not, the system continues to monitor the time (element 506). Otherwise, the key manager calls a generate key method (element 510). The key manager stores the newly generated keys along with their attributes in the key store (element 512).

Thus, several concurrent and related processes occur in the course of operation. In one aspect of operation, a processor receives calls to get keys, determines if the calling application program is authorized to receive the keys, generates a map of the keys, and transfers the map to the calling application program. In another aspect of operation, an interface module calls a get key method and receives a key map. The application program then selects the desired one or more keys in the key map. In yet a third aspect of operation, a processor schedules key generation events and monitors time to determine when it is time for a key generation event to occur. At a key generation event, new keys may be generated for each of one or more key sets.

The invention can take the form of an entirely hardware embodiment, an entirely software embodiment or an embodiment containing both hardware and software elements. In one embodiment, the invention is implemented in software, which includes but is not limited to firmware, resident software, microcode, etc. Furthermore, embodiments can take the form of a computer program product accessible from a machine accessible readable medium providing program code for use by or in connection with a computer such as shown in FIG. 1, or any instruction execution system. For the purposes of this description, a machine accessible or computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a machine accessible medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory 108 employed during actual execution of the program code, bulk storage, and cache memories 102, 190, which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Thus, another embodiment of the invention provides a computer program product containing instructions effective, when executing in a data processing system, to cause the system to perform a series of operations for managing encryption keys. The series of operations generally include receiving requests from an application program to provide one or more keys in a key set or key set group. A key set comprises at least one key and a key set group comprises at least one key set. The operations include determining if the application program is within a scope specified for the key set or key set group. If the application is within the specified scope, then the series of operations include producing a map of the requested keys. The series of operations further comprise generating new keys for a key set according to a predetermined schedule.

The operations may further include storing a version number for each key and to associate the version number of a key with the key. Thus, a key may be identified by an alias prefix and version number. The operations may further comprise getting the latest keys from a key set or key set group specified by the application program. The scope may specify a node or server where which the application program must reside during execution to be authorized to receive the requested keys. In some embodiments, the scope associated with a key set group is at least as narrow as the narrowest scope associated with a key set within the key set group Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An encryption key management system, comprising:
a key manager to determine when an application program requesting one or more keys is authorized to receive the one or more keys and to produce a map of the one or more keys, wherein the key manager is responsive to a request from the application program for all keys in a key set or a key set group to produce a map of all keys in the key set or the key set group, respectively, and the key manager is responsive to a request for latest versions of keys in the key set or key set group to produce a map of the latest versions of keys in the key set or the key set group, respectively, wherein the map of all keys comprises a map with the latest versions of keys and earlier versions of keys and wherein the latest versions of keys comprises versions of keys last generated at a scheduled key generation event, wherein the key manager is to determine whether the application program is within a scope specified for the key set, the scope being the scope of authorized access to the key set, wherein determining whether the application program is within the scope specified for the key set comprises determining whether the application program is associated with a grouping that is associated with the key set;
a key scheduler to schedule at least one key generation event at a pre-determinable time;
a key generator to generate at least one key of the one or more keys at a scheduled key generation event wherein keys generated by the key generator are associated with a key set and a key set group and wherein the key set comprises one or more keys and the key set group comprises one or more key sets; and
a key store comprising memory to store the at least one key along with attributes of the at least one key so that each key is associated with a set of attributes of the key.

2. The system of claim 1, wherein the key manager is to determine whether the application program is within a scope specified for the key set, wherein determining whether the application program is within the scope specified for the key set comprises determining whether the application program is associated with a Process if the scope is the Process, determining whether the application program is associated with a Node representing all processes on a particular machine if the scope is the Node, determining whether the application program is associated with a Node Group representing more than one Node if the scope is the Node Group, determining whether the application program is associated with a Cluster representing a grouping of processes related to a specific application if the scope is the Cluster, or determining whether the application program is associated with a Cell representing a group of Nodes that comprise an entire environment if the scope is the Cell.

3. The system of claim 2, wherein the key manager is to determine a scope to specify a node or server where which the application program must reside during execution to be authorized to receive the one or more keys requested by the key manager.

4. The system of claim 2, wherein the key manager is to determine a scope associated with a key set group that is at least as narrow as the narrowest scope associated with a key set within the key set group.

5. The system of claim 1, wherein the key store stores key attributes that include a version number of each key in a key set or key set group.

6. The system of claim 1, wherein the key manager is to determine if the location of the application program that is requesting one or more keys is within a scope specified for the specified key set or key set group.

7. The system of claim 1, wherein the key manager is to execute a method for retrieving all keys in a key set or key set group.

8. The system of claim 1, wherein the key manager is to execute a method for retrieving only the latest keys in a key set or key set group.

9. A method for managing encryption keys, comprising:
receiving, by an encryption key processor, a call from an application program to provide at least one key associated with a key set or key set group, wherein a key set comprises at least one key and a key set group comprises at least one key set;
determining, by the encryption key processor, if the application program is within a scope specified for the associated key set or key set group, the scope being the scope of authorized access to the key set or key set group, wherein determining if the application program is within the scope specified for the key set or key set group comprises determining whether the application program is associated with a grouping that is associated with the key set or key set group;
if the application is within the scope, then producing, by the encryption key processor, a map of the at least one key associated with the key set or key set group, wherein producing the map comprises producing a map of all keys in the key set or the key set group responsive to a request from the application program for all keys in the key set or the key set group, respectively, and producing a map of the latest versions of keys in the key set or the key set group responsive to a request for latest versions of keys in the key set or key set group, respectively, wherein the map of all keys comprises a map with the latest versions of keys and earlier versions of keys and wherein the latest versions of keys comprises versions of keys last generated at a scheduled key generation event; and
generating, by the encryption key processor, the at least one key to include in the key set or key set group according to a specifiable schedule.

10. The method of claim 9, further comprising associating with a key an alias with a version number, wherein the latest version of a key in a key set is the version of the key last generated according to the schedule.

11. The method of claim 10, wherein all versions of the same key have the same alias prefix.

12. The method of claim 9, wherein a call from an application program to provide keys associated with a key set group may be a specific call to produce a map of only the latest keys in a key set.

13. The method of claim 9, wherein the scope may specify a node or server where which the application program must reside when requesting a key to be authorized to receive the requested key.

14. The method of claim 9, wherein a scope associated with a key set group is at least as narrow as the narrowest scope associated with a key set within the key set group.

15. A computer program product comprising a non-transitory computer useable storage medium having a computer readable program, wherein the computer readable program when executed on a computer causes the computer to:
receive a request from an application program to provide one or more keys in a key set or key set group, wherein a key set comprises at least one key and a key set group comprises at least one key set;
determine if the application program is within a scope specified for the key set or key set group, the scope being the scope of authorized access to the key set or key set group, wherein determining if the application program is within the scope specified for the key set or key set group comprises determining whether the application program is associated with a grouping that is associated with the key set or key set group;
if the application is within the specified scope, then produce a map of the one or more keys, wherein producing the map comprises producing a map of all keys in the key set or the key set group responsive to a request from the application program for all keys in the key set or the key set group, respectively, and producing a map of the latest versions of keys in the key set or the key set group responsive to a request for latest versions of keys in the key set or key set group, respectively, wherein the map of all keys comprises a map with the latest versions of keys and earlier versions of keys and wherein the latest versions of keys comprises versions of keys last generated at a scheduled key generation event; and
generate new keys for a key set according to a predetermined schedule.

16. The computer program product of claim 15, wherein the computer is further caused to store a version number for each key and to associate the version number of a key with the key.

17. The computer program product of claim 15, wherein the computer is further caused by the application program to get the latest keys from a key set or key set group.

18. The computer program product of claim 15, wherein the scope may specify a node or server where which the application program must reside during execution to be authorized to receive the requested keys.

19. The computer program product of claim 15, wherein a scope associated with a key set group is at least as narrow as the narrowest scope associated with a key set within the key set group.

20. The computer program product of claim 15, wherein all versions of the same key have the same alias prefix.

* * * * *